UNITED STATES PATENT OFFICE.

ADOLPH G. ROHDE, OF HOBOKEN, NEW JERSEY, ASSIGNOR OF ONE-HALF TO AUGUST C. HARTMANN, OF SAME PLACE.

GLOVE-POWDER.

SPECIFICATION forming part of Letters Patent No. 684,553, dated October 15, 1901.

Application filed August 6, 1901. Serial No. 71,103. (No specimens.)

*To all whom it may concern:*

Be it known that I, ADOLPH G. ROHDE, a citizen of the United States, and a resident of Hoboken, Hudson county, New Jersey, have invented certain new and useful Improvements in Glove-Powder, of which the following is a specification.

This invention relates to a powder which facilitates the putting on of the glove, and which at the same time beautifies the skin and polishes the finger-nails.

In preparing my improved glove-powder I dissolve one part of white castile-soap in about sixteen parts of tepid distilled water. To this solution I add about four parts of a ten-per-cent. solution of pure tin chlorid in crystals. The resulting magma, oleate of tin, is strained, washed thoroughly with distilled water, and triturated to dryness with carbonate of magnesia, taking, preferably, about one and a half part of the latter to one of the former. One part of this dry mixture is then thoroughly triturated with about two parts of silicate of magnesia and reduced to a very fine powder. After bolting the composition is ready for use.

In use the powder is dusted into the glove to reduce friction and facilitate the drawing of the glove over the hand. During wear the powder will impart a bright polish to the finger-nails and exercise a cooling and softening effect upon the skin.

The oleate of tin forms the nail-polishing element, while the carbonate of magnesia constitutes the absorbent for the same. The silicate of magnesia serves principally to impart antifriction properties to the mixture.

What I claim is—

A glove-powder composed of oleate of tin, carbonate of magnesia, and silicate of magnesia, substantially as specified.

Signed by me at New York city, county and State of New York, this 5th day of August, 1901.

ADOLPH G. ROHDE.

Witnesses:
WILLIAM SCHULZ,
F. V. BRIESEN.